INVENTOR.
AUGUST F. MANZ
BY Barnwell P. King
ATTORNEY

July 14, 1964　　　　　A. F. MANZ　　　　3,141,085
WORK-IN-CIRCUIT CONSUMABLE ELECTRODE ARC WELDING
Filed Nov. 23, 1962　　　　　　　　　　　　2 Sheets-Sheet 2
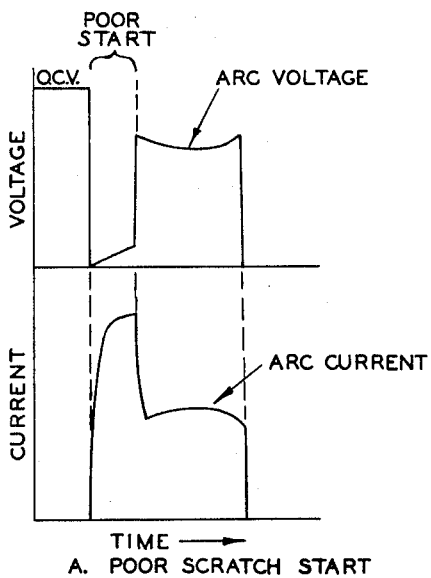
A. POOR SCRATCH START
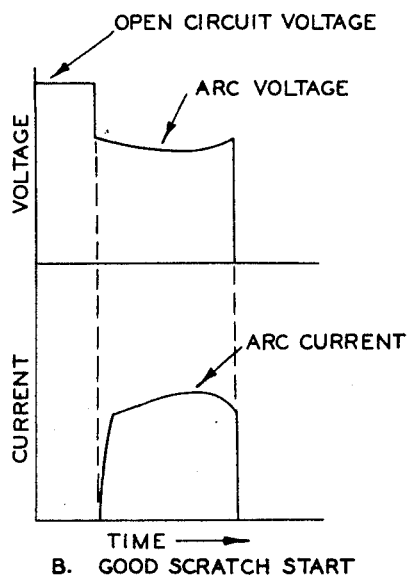
B. GOOD SCRATCH START
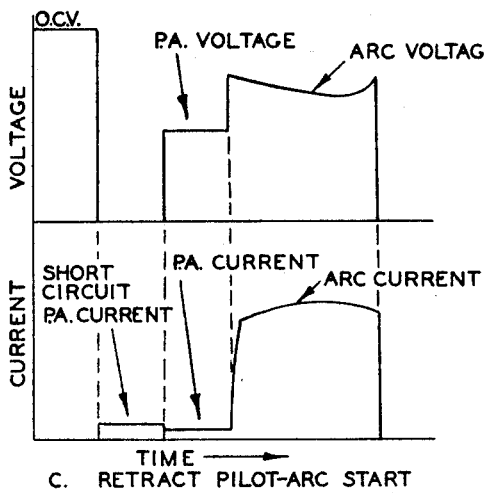
C. RETRACT PILOT-ARC START
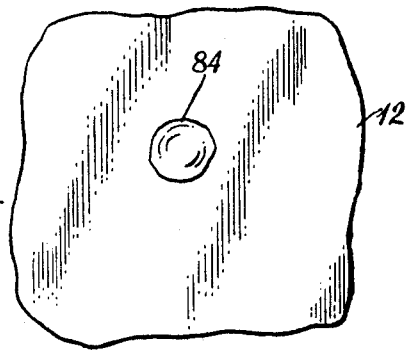
*Fig. 5.*
INVENTOR.
AUGUST F. MANZ
ATTORNEY

United States Patent Office 3,141,085
Patented July 14, 1964

3,141,085
WORK-IN-CIRCUIT CONSUMABLE ELECTRODE
ARC WELDING
August F. Manz, Newark, N.J., assignor to Union
Carbide Corporation, a corporation of New York
Filed Nov. 23, 1962, Ser. No. 239,499
6 Claims. (Cl. 219—130)

This invention relates to "MIG," i.e., work-in-circuit consumable electrode arc welding, and more particularly to the starting thereof.

The invention provides a method of consumable electrode welding arc starting, comprising feeding a consumable electrode toward a piece of work to be welded, impressing a regulated voltage from a suitable source of electric power between the electrode and such piece to be welded such that a relatively low current is caused to flow when the electrode touches such piece retracting said electrode from said workpiece to cause a gap to be created between said workpiece and said electrode upon initiation of said low current flow, across which a relatively low current arc is initiated by said source of regulated voltage, sensing the presence of such relatively low current arc, feeding said electrode in response to such presence toward the workpiece at a welding rate, and changing said regulated voltage in response to such arc presence to cause the such low current arc to be changed to a welding current arc.

The invention also provides a novel control system for starting MIG welding.

The starting of a MIG spot weld on aluminum is quite a separate problem from the actual fusion process. At present, so-called "Scratch" starting is used. The consumable electrode inches toward the work at the open circuit welding potential and, upon short circuiting, establishes an arc with the welding current flow. The wire is immediately accelerated to the welding speed and the MIG spot is made. Certain minimum starting currents, independent of the welding condition must be maintained to facilitate scratch starting. When the electrode short circuits to the work, a condition similar to a common fuse exists. If the wire has a pointed tip, the arc will be readily established from it with little spatter. More often, the electrode wire tip is left with a solidified ball from the previous spot-weld. Upon shorting, the I²R heating effect will often cause the electrode to melt some ¼ to ¾ in. above the work contact point. The force of the so-initiated arc blows the lower wire stub off, causing a serious spatter problem. The accompanying loss of weld time and wire mass to the spot-weld is critical for weld time of 10 to 25 cycles.

The tenacious oxide on aluminum also affects the scratch starting mechanism. The insulating effect of such oxide, coupled with inconsistent wire tip configuration, causes variable time delay in the ignition of the arc. During this delay, the wire is feeding at either inching or welding speed. The accompanying stubbing condition can cause the wire to kink, facilitating spatter from bent wire and "wrap-arounds" on the feed rolls from undue friction in the wire feeding system. The degree to which the above condition affects welding consistency depends in part on the size and stiffness of the wire. Soft wire below ¹⁄₁₆ in. diameter is most sensitive.

It appears from a representation of scratch-started weld cycles reproduced from oscilloscope traces that a "poor" scratch start has a low voltage, high time. A good scratch start has a smoother transition from open circuit to welding voltage. The "poor" scratch start will inevitably produce spatter, depending on the arc ignition point.

The main object of this invention is to provide a novel method of starting which virtually eliminates objectionable spatter in consumable electrode arc welding, particularly MIG welding, while improving the quality of the resulting welds.

Another object is to provide an automatic circuit for such purpose that is simple, yet reliable in operation, and easy to service and maintain.

Other objects will appear from the present disclosure.

Such objects are accomplished by what is termed herein as "retract pilot-arc starting" in which a pilot arc (approximately 5-10 amps.) is established between the electrode wire and the work before the welding current is introduced.

In the drawings:

FIG. 2 is a graph of oscilloscope traces of voltage and current vs. time of a poor scratch start of the prior art;

FIG. 3 is a similar graph of a good scratch start of the prior art;

FIG. 4 is a similar graph of a retract pilot-arc start according to the invention; and FIG. 5 is a plan view of a MIG spot weld.

Figure 1:
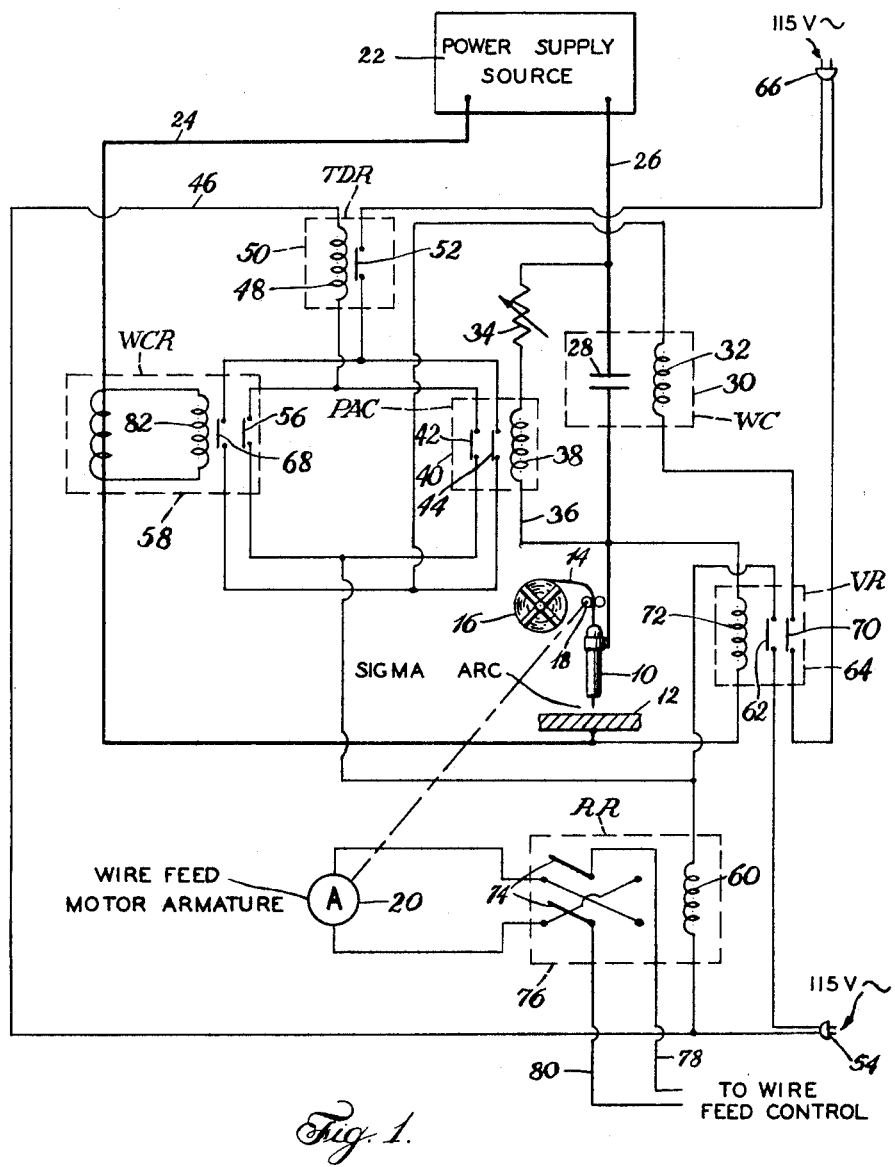
FIG. 1 is a circuit diagram of a retract pilot-arc starting system illustrating the invention.

As shown in FIG. 1, a sigma welding torch 10 is mounted above the work 12 to be welded. An electrode wire 14 is drawn from a reel 16 and fed through such torch toward such work, by feed rolls 18 which are driven by a wire feed motor having an armature 20. The work and electrode wire are connected in a series circuit which includes welding power supply source 22, such as a Linde SVI 500 (U.S. Patent No. 3,054,884), the voltage of which is regulated, and leads 24 and 26, as well as a guide-contact tube in the torch 10, through which the wire 14 passes. The circuit of lead 26 includes normally open weld contacts 28 of a weld-contactor relay 30 having a coil 32 for operating such contacts.

An adjustable pilot arc current resistor 34 is connected in a shunt circuit 36 across the weld contacts 28. Such shunt circuit 36 includes the coil 38 of a pilot arc current relay 40 having two pairs of normally open contacts 42 and 44. The contacts 42 are included in a circuit 46 which includes the coil 48 of a time delay relay 50 provided with normally open contacts 52. One side of the circuit 46 leads to a plug 54 which is connected to a regulated voltage source of 115 volts A.C. while the other side is connected to contacts 42, which are in parallel connection with N.O. contacts 56 of a weld current relay 58, and then connected to one side of reversing relay coil 60; the other side of which is connected to plug 54.

From coil 60 the circuit 46 is connected to contacts 62 of voltage relay 64, and then to the other side of plug 54. One side of plug 66 is connected to contacts 52 of relay 50, and then to contacts 44 in parallel relation with contacts 68 of relay 58; parallel contacts 68 and 44 are then connected to one side of coil 32, the other side of which is connected to contacts 70 of relay 64, contacts 70 which, in turn, are connected to the other side of plug 66. Plug 66 is connected to a source of 115 volts A.C. Voltage coil 72 of relay 64 is connected to torch 10 and lead 36, and to the work piece 12. Motor armature 20 which drives fed rolls 18 is connected to the reversing relay contacts 74 which reverse the direction of current flow in armature 20 when coil 60 of reversing relay 76 is energized by the closing of contacts 62. The armature 20 is supplied with power from a wire feed control by leads 78 and 80.

Referring to FIG. 1, operation of the illustrated circuit is as follows:

(1) Depress torch trigger (not shown) associated with wire feed control.

(a) Open circuit voltage (OCV) appears between the end of wire 14 and work 12 through pilot-arc current (PAC) resistor 34 and PAC relay coil 38.

(b) Voltage relay (VR) coil 72 energized.

(2) Voltage relay contacts 62 and 64 close.

(a) Closure of (VR) contacts 62 energizes reversing relay ((RR) coil 60.

(b) RR contacts 74 operates wire feed motor armature 20 so that wire 14 inches toward work 12.

(3) Wire 14 touches work 12. Pilot-arc current flows through PAC resistor 34 and PAC relay coil 38. OCV drops to zero.

(a) PAC relay coil energizes 38. PAC contacts 42 and 44 close.

(b) VR coil 72 de-energizes. VR contacts 62 and 64 open.

(c) VR contacts 62 de-energizes RR coil 60—RR switch 74 reverses wire feed motor armature 20 so that wire 14 retracts.

(4) Pilot-arc is established between work 12 and end of wire 14.

(a) VR coil 72 energizes again as pilot-arc voltage is established. VR contacts 62 and 64 close.

(b) Time delay relay (TDR) coil 48 energizes through PAC relay 38 contacts 42 and 44. VR contacts 62 also energizes RR coil 60. RR switch 74 reverses wire drive motor armature 20 so that wire 14 again feeds toward work 12.

(5) TDR coil 48 times out.

(a) TD contacts 52 close. Welding contactor (WC) coil 32 energizes through VR contacts 70, PAC relay contacts 44 and TDR contacts 52.

(6) Weld initiated by closure of WC contacts 28.

(a) Wire 14 feeds down at welding speed, wire feed motor is energized by wire feed contact.

(b) Welding current relay (WCR) coil 82 energizes. WCR contacts 56 and 68 close.

(1) WCR contacts 56 parallels PAC relay contacts 42.

(2) WCR contacts 68 parallels PAC relay contacts 44.

(7) PAC coil 38 shorted out by WC contacts 28.

(a) PAC relay contacts 42 and 44 open.

(b) TDR coil 48 continues energizes through contacts VR 62 and 64.

(c) WC coil 30 continues energizes by VR contacts 64, TDR contacts 52 and WCR contacts 68.

(8) Welding timer, not shown, times out, terminating weld cycle.

NOTE.—If a pilot-arc is not established in step 4, the system will automatically return to step 1 and recycle.

To recap, the illustrated system follows the following sequence:

(1) Upon depressing the torch trigger the wire 14 inches toward the work 12.

(2) When the wire 14 short circuits to the work 12, the wire drive motor armature 20 is reversed and the electrode wire 14 retracts at inching speed, establishing a low current pilot arc.

(3) With such pilot-arc established, the wire motor armature 20 returns to the forward driving condition. Weld current and weld wire feed speed are then introduced and the MIG spot-weld 84, FIG. 5, is made.

The current and voltage-time characteristics of a retract pilot-arc initiated MIG spot-weld reproduced from oscilloscope traces, are shown in FIG. 4. The pilot-arc short circuit current and the steady state pilot-arc current are insufficient to cause appreciable wire melting. The retract start facilitates a smooth transition from pilot-arc current to welding current. High welding current surges are eliminated which, in turn, eliminate objectionable spatter. Full welding time and heat input are realized because of positive starting at the tip of the wire electrode.

A comparison between prior scratch starting and retract pilot arc starting was made at two different welding times, emphasizes the increase in consistency obtained from retract pilot-arc starting over scratch starting. Pilot-arc starting according to the invention reduces the critical variations and thus renders the process more reliable.

Unlike scratch starting, the use of retract pilot-arc starting separates the welding conditions from the starting conditions. Higher or lower welding currents than were previously practical can now be utilized. Earlier use of high current caused violet arc ignition and low current was often insufficient to consistently establish the arc.

The inching speed used in conjunction with retract pilot-arc starting must satisfy two conditions; first, the inching speed must be fast enough so as not to allow the wire to dwell at the short circuit position too long. Excessive dwell may cause the wire to stick to the work. This condition can be aggravated by the wire slack in the conduit which must be taken up before the tip of the wire reverses. Second, the inching speed must be slow enough so as to maintain the pilot-arc while the drive motor and contactor cycle properly. The time delay relay is incorporated into the retract circuit (FIG. 1) to ensure a forward driving condition in the reversing relay before weld current and wire feed speed are introduced.

The relative hardness of the wire drive roll must be properly matched to the condition of the wire (hard or soft). The use of a relatively hard wire drive roll on 1/16 in. Linde Oxweld No. 23 wire (soft) produced kinking, especially during the reversing cycles of retract starting. These kinks, formed at the drive point, were subsequently forced into the conduit and caused excessive friction. The use of a soft wire drive roll (designated aluminum) eliminated this problem.

The use of the soft wire drive roll on Linde Oxweld No. 67 wire (hard) proved to be inadequate. Inconsistent feeding due to wire slippage was caused by friction in the system. A relatively hard wire drive roll, therefore, is recommended to provide positive feeding in such case.

The invention by actual test includes the following advantages:

(1) Retract pilot-arc starting offered more consistent starting of a MIG spot-weld. This resulted in much less wire spatter and better surface appearance similar to that obtained with scratch starting on chemically-cleaned plate and by cutting the wire prior to every spot-weld.

(2) Improved shear distribution was indicated by the use of retract pilot-arc starting. Short welding times (10–20 cycles) showed marked improvement, while long welding times (over 30 cycles) showed some improvement.

(3) Retract pilot-arc starting essentially separated the starting conditions from the welding conditions, and thus allowed a wider choice in the welding conditions.

(4) No wrap-arounds or burn-backs were experienced with retract pilot-arc starting.

What is claimed is:

1. Work-in-circuit consumable electrode arc welding, which comprises applying a regulated voltage between an electrode-wire and the work to be welded so that a relatively low current flows when such wire touches the work, relatively slowly feeding such wire toward the work until the wire touches the work; initiating such low current flow as soon as the so-fed wire touches the work, retracting the wire upon initiation of such low current flow by such regulated voltage; drawing a non-spattering pilot-arc between the so-retracted wire and the work by virtue of such low current at such regulated voltage; and in response to such low current flow, stopping the retraction of such wire and feeding it at a welding rate toward such work at a regulated welding voltage such that the welding current arc is smoothly established.

2. Welding as defined by claim 1, in which a predetermined time delay is provided at the end of the retraction of such wire in order to insure the forward driving condition upon reversal of the wire feed, before the welding current and wire feed speed are introduced.

3. Method of consumable electrode welding arc starting, comprising feeding a consumable electrode toward a piece of work to be welded, impressing a regulated voltage from a suitable source between said electrode and said piece to be welded such that a relatively low current is caused to flow, retracting said electrode from said workpiece to cause a gap to be created between said workpiece and said electrode upon initiation of said low current flow, across which a relatively low current arc is initiated by said source of regulated voltage, sensing the presence of said relatively low current arc, feeding said electrode in response to said presence toward the workpiece at a welding rate, and changing said regulated voltage in response to such arc presence to cause said low current arc to be changed to a welding current arc.

4. Work-in-circuit consumable electrode gas-shielded arc welding which comprises feeding an electrode wire toward work-in-circuit at a selected speed less than the welding speed, while applying a regulated voltage between the end of such wire and the work; when such end touches the work, retracting such wire, thereby energizing a pilot arc with a current of between approximately 5 and 25 amps.; reversing such wire feed in response to such pilot arc current flow and voltage, and then feeding such wire at a welding rate toward the work while simultaneously increasing such voltage to an arc welding value to provide a current greater than 25 amps., thereby substantially preventing any objectionable spatter in starting the welding operation.

5. A control system for starting consumable electrode arc welding smoothly and without any objectionable spatter, which comprises means for applying a potential derived from a source of regulated voltage across a consumable electrode wire and the work to be welded; means for "inching" such wire toward the work at a preselected speed which is relatively low; means for automatically retracting such wire as soon as the end thereof forms a short circuit with such work, thereby energizing a relatively low current pilot arc; means acting in response to the flow of such pilot-arc current for reversing the wire feed; means for then feeding such wire back toward the work at welding speed, and means acting simultaneously therewith to increase such potential, whereby the arc current is changed to a preselected welding value.

6. Work-in-circuit consumable electrode arc welding apparatus, comprising the combination of a wire drive motor; means driven by said motor for feeding an electrode wire toward and away from the work to be welded; means connecting said wire and work to a power supply source of regulated voltage, including the normally open contacts of a welding relay and the coil of a weld-current relay; a shunt circuit connected across said contacts including a pilot arc current resistor and the coil of a normally open current relay; means connecting said wire drive motor to a wire feed control, including a motor reversing relay provided with a coil; means for supplying current to said motor reversing relay coil including a voltage relay having a coil connected across said wire and the work, normally open contacts connected in series with said motor reversing relay coil, and normally open contacts connected in series with said normally open contactor; and a time delay relay having a coil energized in response to the closure of normally open contacts of said weld-current relay and of said pilot-arc current relay, and normally open contacts in series with normally open contacts in parallel circuit relation with such weld-current and pilot-arc current relays; whereby upon initiating the control the wire inches toward the work; when the wire establishes a short circuit with the work the wire drive motor is reversed and the electrode retracts at inching speed, establishing a low current pilot-arc, and with the pilot arc established the wire motor returns to the forward driving condition, and weld current and weld wire feed speed are then introduced and the weld is made.

References Cited in the file of this patent
UNITED STATES PATENTS 2,806,127    Hackman _____ Sept. 10, 1957
3,054,886    Allen et al. _____ Sept. 18, 1962